Sept. 22, 1970　　　J. EHRBAR ET AL　　　3,529,743
CONTAINER OF THERMOPLASTIC SYNTHETIC MATERIAL
Filed Aug. 21, 1968　　　　　　　　　　　　3 Sheets-Sheet 3
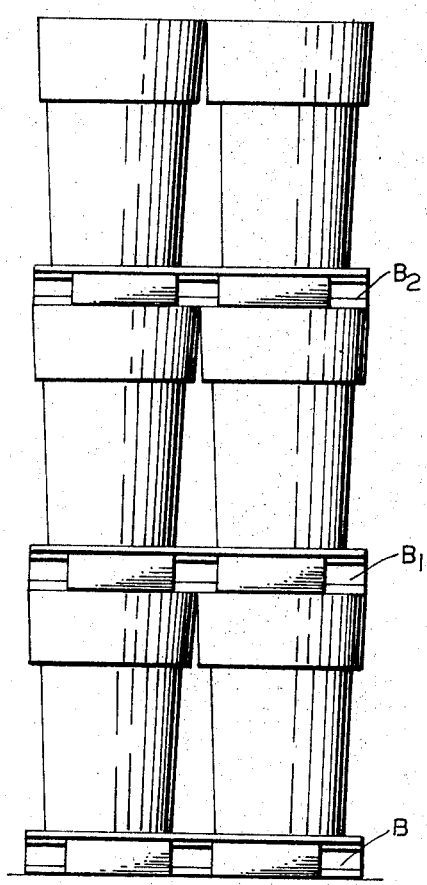
FIG.3
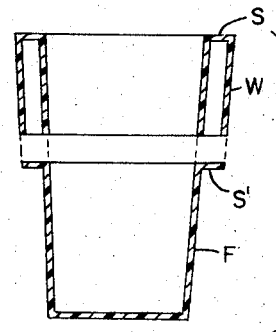
FIG.6
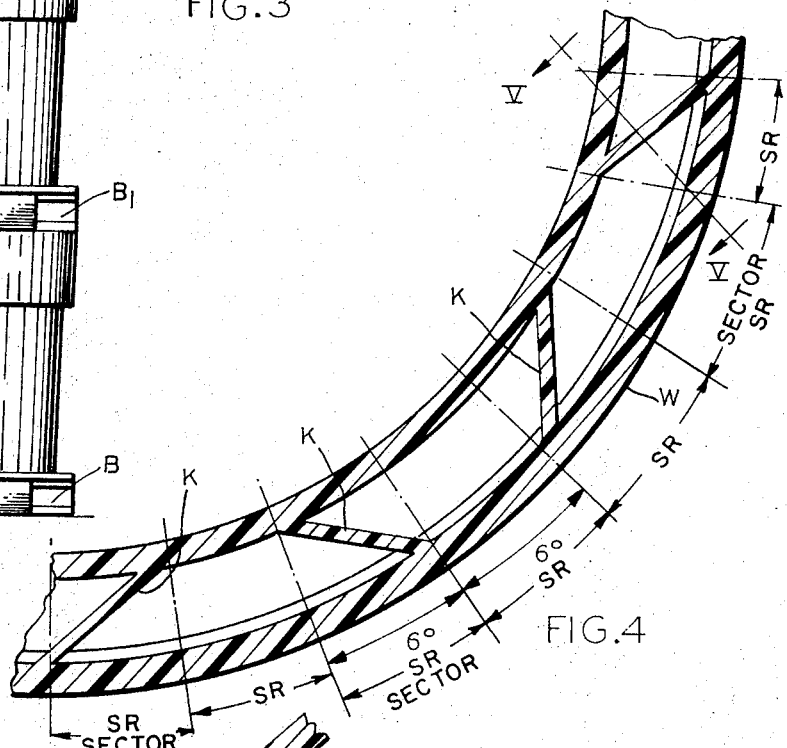
FIG.4
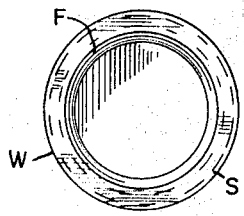
FIG.7
FIG.5
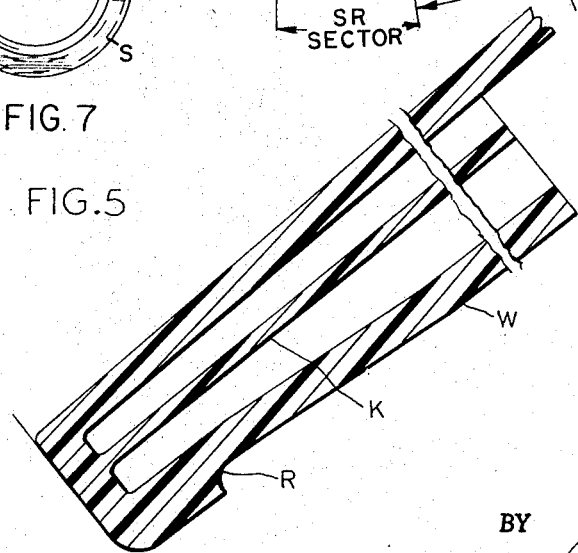
INVENTORS
JAKOB EHRBAR
ERNST SCHLAEFLI
BY Wenderoth, Lind & Ponack
ATTORNEYS United States Patent Office 3,529,743
Patented Sept. 22, 1970

3,529,743
CONTAINER OF THERMOPLASTIC SYNTHETIC MATERIAL
Jakob Ehrbar, Allschwil, and Ernst Schlaefli, Muttenz, Switzerland, assignors to Ciba Limited, Basel, Switzerland, a Swiss company
Filed Aug. 21, 1968, Ser. No. 754,261
Claims priority, application Switzerland, Aug. 22, 1967, 11,774/67
Int. Cl. B65d 7/42
U.S. Cl. 220—74    12 Claims

ABSTRACT OF THE DISCLOSURE

A strong but lightweight, stackable, rollable transport and storage container of thermoplastic synthetic material having a generally frusto-conical shape with an external wall surrounding and spaced from that part of the wall of said container adjacent its largest and upper end to provide a cavity between the external surrounding wall and the container wall. Preferably the container embodies reenforcing ribs angularly and unitarily joining the external wall to the container wall, and the relatively thin wall thickness is substantially the same throughout the entire container, including that of the external wall. The material from which the container is fabricated is satisfactorily stable to external and internal attack by many of the products held therein, is resistant to buckling under impact, shock, and in combination with its overall design imparts substantial rigidity both in the radial and axial directions thereto.

Figure 1:
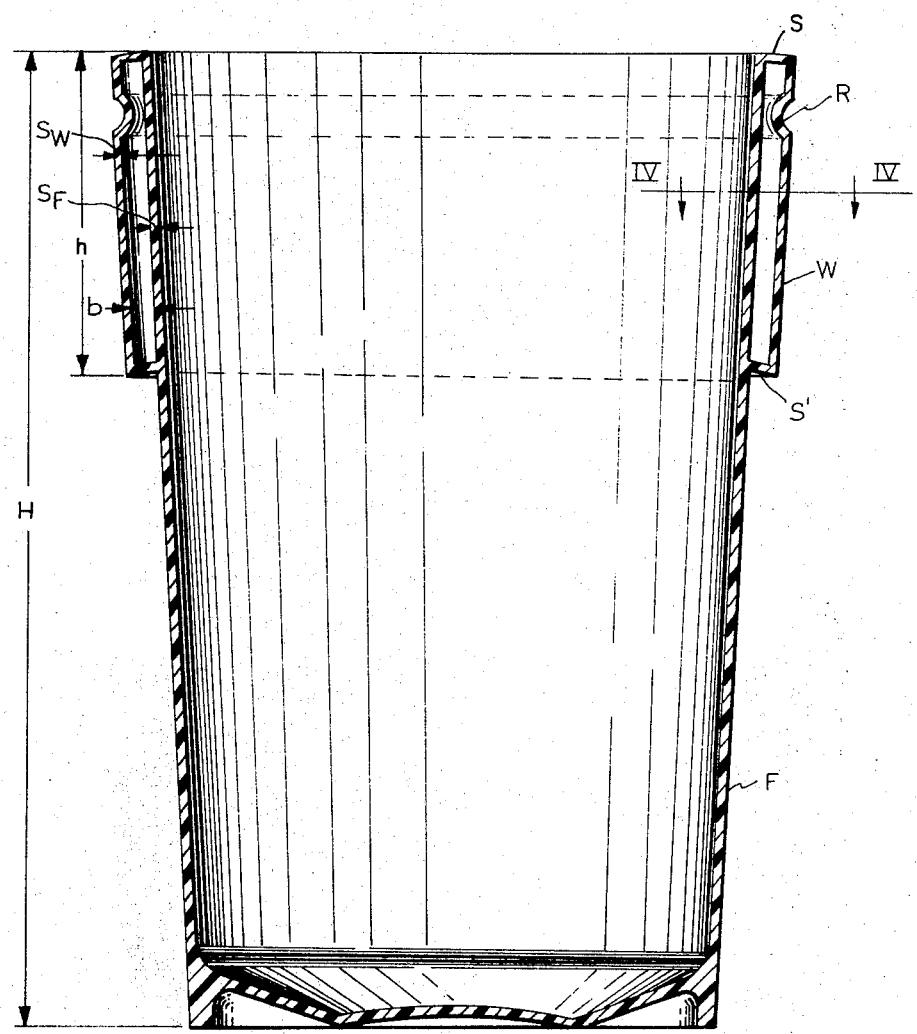

This invention relates to containers and more particularly to an improved transportable storage container made of thermoplastic synthetic material.

Containers for efficiently transporting and temporarily storing granular, pulverulent, paste-like or liquid chemical products are required by industrial users to satisfy one or more of the following demands:

The containers should be corrosion-resistant;
They should combine mechanical strength with light weight;
The contents of the containers should not be contaminated by decomposition products, splinters or abrasion products of the material of the container itself;
The containers should be capable of being easily and thoroughly cleaned, particularly when the product they are to contain is changed;
The containers should be capable of being manually rolled for transportation over short distances;
They should be capable of being quickly and completely emptied, particularly with the aid of swivelling barrel manipulators or tipping devices and the containers should be strong enough to withstand the stresses involved besides having the most favourable shape for mechanical manipulation;
The axial compressive strength of the containers should be sufficient to permit at least three layers of full containers to be stacked; and
The empty containers should be capable of being stacked the one inside the other to occupy minimum space.

For internal factory use so-called stackable barrels of about 100 to 300 litres capacity have been widely used, but a solution which satisfies many of the above listed demands has not yet been found. Stackable wooden or metal barrels are liable to be attacked by the goods they contain and by the weather. Larger capacity plastics containers have not yet found favour, because known forms of construction are either mechanically too weak or their walls are uneconomically thick.

According to the present invention, therefore, we provide a transport and storage container of thermoplastic synthetic material having a frusto-conical shape with an external wall surrounding and spaced from that part of the wall of said container adjacent its largest end to provide a cavity between the external and container walls.

The container described herein and forming a preferred embodiment of the invention is designed to hold at least 50 litres and preferably between 100 and 300 litres. The proposed container is of frusto-conical shape and has an enlarged upper section.

Plastic containers according to the present invention can be made from various thermoplastic synthetic materials, such as polyolefines, having a modulus of elasticity of between 2000 to 50,000 kg./cm.$^2$ by conventional methods of production. The material used is satisfactorily stable to external as well as internal attack by many of the products the container is intended to hold, besides being resistant to buckling under impact, shock and rough usage in handling. The proposed shape imparts to the container sufficient rigidity both in the radial and axial directions, despite the relatively low moduli of elasticity and creep of the material and their gradual change in time. Consequently even relatively thin walls are capable of providing sufficient radial strength for manual handling and for mechanical manipulation with grippers, and at the same time the axial compressive strength is high enough to permit full containers to be stacked in several tiers without risk. Even in the course of long periods of use only very slight deformations occur. Owing to their frusto-conical shape and the enlarged upper part, empty containers can be stacked without becoming jammed by placing them one inside the other. Moreover, because of their circular circumference individual or stacked containers can be rolled manually when they are empty as well as when they are full. They can be rapidly and completely emptied and easily cleaned, even after having held viscous and sticky products. When empty containers are stacked one inside the other the enlarged upper portion forms an abutment. Hence the proposed containers meet many of the above listed requirements.

Compared with a solid enlarged upper portion the proposed hollow construction has the advantage of saving material and weight without causing a significant reduction in strength particularly if the interior of the enlarged portion is stiffened by reinforcing ribs.

Figure 2:
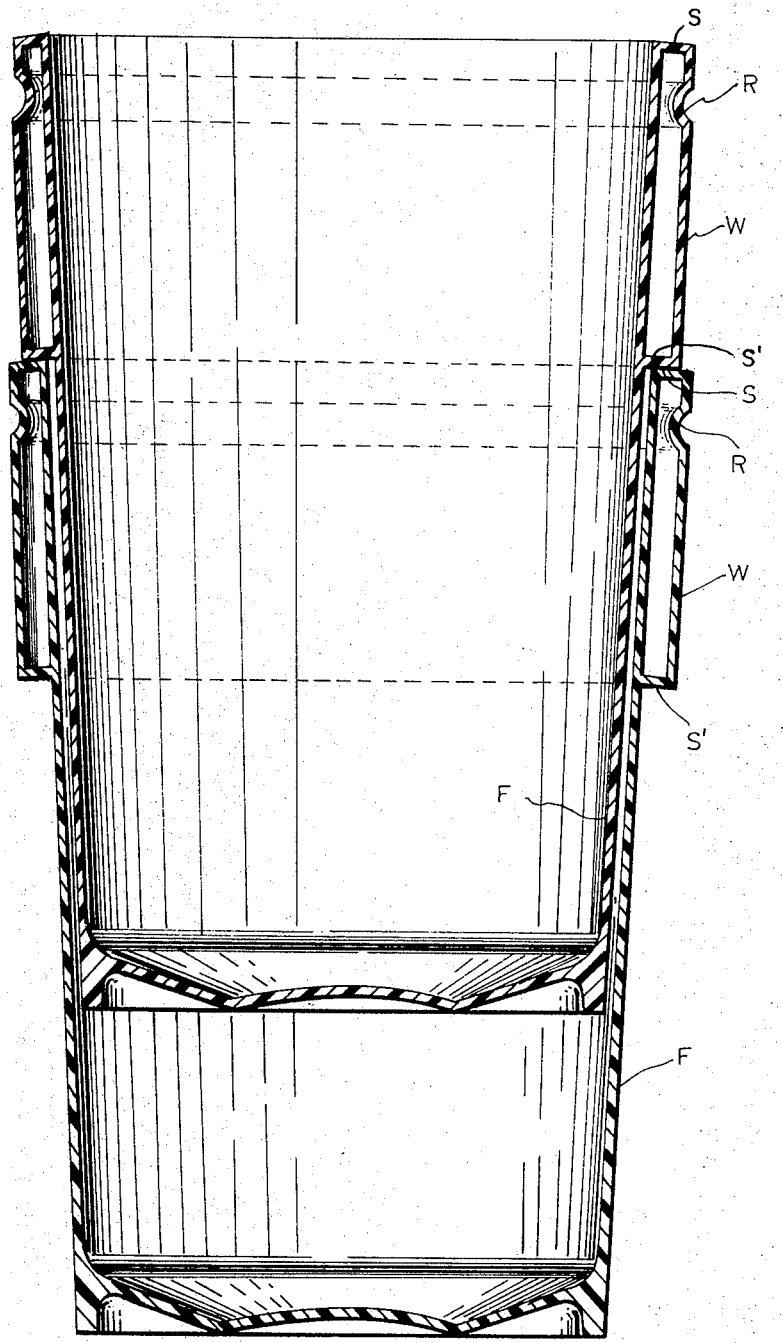

The invention will be hereinafter more particularly described with reference to an embodiment illustratively shown in the drawings in which:

FIG. 1 is a section through a container in accordance with the present invention, FIG. 2 shows two containers as illustrated in FIG. 1, stacked one inside the other, FIG. 3 shows three layers of stacked containers in elevation on a reduced scale, FIG. 4 is a section taken on the line IV—IV in FIG. 1, on a larger scale, FIG. 5 is a section of the enlarged upper portion of the container taken on the line V—V in FIG. 4.

FIG. 6 is a schematic exploded cross-sectional view showing the container as made in two separate parts, prior to joining same; and FIG. 7 is a reduced size, top plan view of one embodiment of the subject invention.

In the drawings the lower part of the container is marked F and the upper part comprising the enlarged hollow portion is marked W. As will be seen in the drawing the enlarged portion W is formed with an annular shallow indentation R for securing a sealing sheet that may be stretched over the top of the container. If desired several such indentations may be provided. The lower end S' or bottom edge of the enlarged portion W serves firstly to provide purchase for a manipulating tool, and secondly to form an abutment for stacking the containers one inside another.

It will be understood by reference to FIG. 2 that when the empty containers are thus stacked the one inside the other, the bottom wall or edge S' of the enlarged upper portion of the inside container rests on the upper end wall or edge S of the enlarged portion of the outside container.

FIG. 3 illustrates that full containers are stacked with the interposition of pallets or supporting plates, and a further bottom support B may also be provided.

In the case of the illustrated containers the height $h$ of the enlarged portion is equal to about ⅓ of the overall height H of the container. In practice a ratio $h:H$ of 1:4 has proved to be very satisfactory. The exterior wall of the enlarged portion W and the wall of the lower part of the container may preferably have the same wall thickness ($s_F = s_W$). The average width $b$ (external dimensions) of the hollow enlarged portion may roughly correspond to 5 times the thickness $s_F$ of the container wall. In the case of containers having a diameter at the top of 500 to 600 mm. and at the bottom of 450 to 500 mm. and a height H of about 800 to 900 mm. (container capacity 160 litres), the proposed form of construction permits the wall thickness $s_F$ to be as little as 3 to 5 mm.

A ratio of height H of the container to a height $h$ of the hollow enlarged portion of between 3:1 and 4:1 will be optimal for most applications. However, this ratio may be varied between about 2:1 and 6:1. The same applies to the ratio of the thickness $s_F$ of the container wall to the width $b$ of the hollow enlarged portion, which may vary within the range of from about 1:4 and 1:10.

The interior of the enlarged portion W may be completely empty. However, it is preferred, as illustrated in FIGS. 4 and 5, to provide reinforcing ribs K in the interior. The illustrated disposition of the ribs is so chosen that successive ribs are inclined in opposite directions in relation to radial or axial planes of the container which they intersect. In practice a form of construction has proved satisfactory in which one rib is provided in the hollow interior of the enlarged portion in every other sector SR of the container cross section which is assumed to be divided into 6° sectors of an annulus as shown in FIG. 4.

The cross section of the hollow enlarged portion W may be generally rectangular or it may have a slight taper contrary to the direction of taper of the main container wall. This type of configuration is illustrated in FIG. 5. In the first place a hollow enlarged portion of contrary taper has technical advantages when injection moulding techniques are used and, besides, it permits the use of manipulating tools of simpler construction. The contrary taper may be so chosen that the exterior of the enlarged portion is cylindrical or has a taper opposed to that of the container wall.

The proposed container can be produced by spinning or by injection moulding. Centrifugal casting permits the entire container comprising a lower portion and the enlarged portion to be integrally produced. For injection moulding it is better to produce the two parts separately and to bond them together with an adhesive or by fusion welding according to the nature of the material. For injection moulding it has also been found best to divide the two parts above the bottom end wall of the enlarged portion. The bottom end wall S' of the enlarged portion may then be directly moulded on the lower portion F of the container, i.e. integrally moulded therewith, the free ends of the two walls of the enlarged portion forming the upper part being then bonded to the bottom wall with an adhesive or by fusion welding as indicated in FIG. 6. If reinforcing ribs are formed inside the enlarged portion the bottom edges of the ribs are likewise preferably bonded adhesively or by fusion to the bottom wall of the enlarged portion which is integrally formed on the lower part of the container. The upper and bottom parts of the container can be bonded together by fusion in one operation. This also applies to the formation of the bond after the prior application of an adhesive. It is also possible to produce the container including its enlarged portion as an integral injection moulding, provided the bottom end wall S' of the enlarged portion is omitted. In the presence of reinforcing ribs K this hardly reduces the mechanical strength. The bottom end wall of the enlarged portion may also be provided by the subsequent provision of an annular ring which may be inserted and welded or adhesively bonded in place. As an alternative in a two-part production process, the lower portion F of the container may be produced by blowing. Injection moulding of the upper part or enlarged portion is so performed that the external wall is connected by webs to the inner wall, each end of the webs being moulded to one of the walls thus to form one of the two injection mouldings.

We claim:

1. A transport and storage container adapted for nesting when empty and for stacking when full, comprising a main body including lower and upper wall portions, with a container capacity of at least 50 liters, and fabricated of thermoplastic synthetic material having a generally frusto-conical shape, said body including an annular external reenforcing wall which has a thickness of at least 3 mm. surrounding and spaced from the upper and wider part of the main body wall of said container to provide a cavity between said external and main body container walls, and wherein the height of the external wall is between about ¼ to ⅓ of the overall height of the container commencing down from the top of the upper portion, and said external wall is joined to the main wall of the container by a plurality of reenforcing ribs whose planes are generally vertically disposed, and which ribs are so disposed that their joining edges lie in a generatrix of said external and main container walls, respectively.

2. A container as defined in claim 1, in which said external wall is cylindrical and circular in horizontal cross-section.

3. A container as defined in claim 1 wherein the synthetic plastic material has a modulus of elasticity of between approximately 2000 and 50,000 kg./cm.$^2$.

4. A container as defined in claim 1 wherein the container is provided with at least one groove in the outer periphery of the etxernal reenforcing wall adjacent an upper portion thereof.

5. A container as claimed in claim 1 in which a vertical cross section of said cavity is generally rectangular in form.

6. A container as claimed in claim 1 in which the distance between the exterior of the external wall and the interior of the main wall of the container is within a range from about 4 to 10 times the wall thickness of the container.

7. A container as claimed in claim 1 in which the container wall thickness is substantially the same throughout the entire container, and is substantially the same as the external wall thickness.

8. A container as claimed in claim 1 in which in horizontal cross section of the container through the upper portion at a level of the external wall of the container the double wall portion of the container is divided into a plurality of equal sectors of an annulus, and said joining ribs are disposed at alternate angles in relation to axially extending radial planes passing through the container at its center vertical axis, and which said ribs and walls intersect in every other of said equal sectors spaced around the circumference of the container.

9. A container as defined in claim 8 wherein the plurality of reinforcing ribs include thirty such ribs interposed between sixty equal sectors.

10. A container as defined in claim 8 in which said ribs are positioned diagonally across the sectors in which they are disposed.

11. A container as defined in claim 1 in which the container is fabricated in and assembled from two separate parts or portions including the upper and lower portions, said lower portion having an upper annular edge; the part forming the lower portion of the container having a transverse bottom wall and an upper annular radially projecting flange integral with the upper annular edge of said lower portion wall and forming a transverse closure for the bottom of said cavity, which closure also forms an abutment for empty nest-stacking of said containers; and said upper portion of the container including said spaced external wall and upper main body wall portions integrally interjoined by said reenforcing ribs, the two portions being bonded together by means to adhesively or fusedly join said portions at least at the inner and outer peripheral portions of said radial projecting annular flange.

12. A container as defined in claim 11 wherein the two portions are further interjoined along the bottom edges of said reenforcing ribs.

References Cited

UNITED STATES PATENTS

| | | | |
|---|---|---|---|
| 1,716,725 | 6/1929 | Gruber | 220—73 |
| 1,934,220 | 11/1933 | Willson | 220—73 |
| 2,515,709 | 7/1950 | Heard et al. | 220—97 X |
| 2,602,568 | 7/1952 | Kinney | 220—97 |
| 2,703,921 | 3/1955 | Brown. | |
| 2,944,721 | 7/1960 | Choate | 220—74 X |
| 3,209,290 | 9/1965 | Grande | 220—15 X |
| 3,291,361 | 12/1966 | Commeyras | 220—74 X |

JOSEPH R. LECLAIR, Primary Examiner

J. R. GARRETT, Assistant Examiner

U.S. Cl. X.R.

220—15, 83, 97